United States Patent
Görg et al.

(10) Patent No.: US 8,409,312 B2
(45) Date of Patent: Apr. 2, 2013

(54) FILTER UNIT FOR FILTERING GASEOUS FLUIDS

(75) Inventors: Günter Görg, Möglingen (DE); Markus Hanselmann, Lauffen a. N. (DE); Thomas Jessberger, Asperg (DE); Michael Metzger, Waiblingen (DE); Frank Pfeiffer, Mönsheim (DE); Björn Schmid, Stuttgart (DE); Arthur Sudermann, Ditzingen (DE)

(73) Assignee: Mann + Hummel GmbH, Ludwigsburg (DE)

( * ) Notice: Subject to any disclaimer, the term of this patent is extended or adjusted under 35 U.S.C. 154(b) by 70 days.

(21) Appl. No.: 12/997,440

(22) PCT Filed: Jun. 10, 2009

(86) PCT No.: PCT/EP2009/057138
§ 371 (c)(1),
(2), (4) Date: Mar. 30, 2011

(87) PCT Pub. No.: WO2009/150165
PCT Pub. Date: Dec. 17, 2009

(65) Prior Publication Data
US 2011/0167776 A1    Jul. 14, 2011

(30) Foreign Application Priority Data

Jun. 11, 2008  (DE) .......................... 10 2008 027 847
Feb. 16, 2009  (DE) .......................... 10 2009 009 066

(51) Int. Cl.
*B01D 46/00*      (2006.01)

(52) U.S. Cl. ............. 55/385.3; 55/493; 55/497; 55/502; 123/198 E (58) Field of Classification Search ................. 55/385.3, 55/495, 497, 498, 502, 503, 490, DIG. 5, 55/493; 210/435; 123/198 E; 454/158
See application file for complete search history.

(56) References Cited

U.S. PATENT DOCUMENTS

| | | | |
|---|---|---|---|
| 5,554,205 A * | 9/1996 | Ernst et al. ................... | 55/385.3 |
| 5,605,554 A * | 2/1997 | Kennedy ......................... | 55/493 |
| 5,640,937 A | 6/1997 | Slopsema | |
| 5,725,624 A * | 3/1998 | Ernst et al. ..................... | 55/502 |
| 5,730,768 A | 3/1998 | Kaminaga | |
| 5,888,442 A | 3/1999 | Kometani | |
| 6,293,984 B1 * | 9/2001 | Oda et al. ........................ | 55/497 |
| 6,508,851 B2 * | 1/2003 | Goerg ............................ | 55/385.3 |

(Continued)

FOREIGN PATENT DOCUMENTS

DE  20011003 U1  11/2001
EP  0982062        3/2000

OTHER PUBLICATIONS

International Search report of PCT/EP2009/057138.

*Primary Examiner* — Duane Smith
*Assistant Examiner* — Minh-Chau Pham
(74) *Attorney, Agent, or Firm* — James Hasselbeck (57) ABSTRACT

The invention relates to a filter unit for filtering gaseous fluids, comprising a filter insert part with a filter medium and a sealing element, said element being clamped between sealing struts on parts of the filter housing. The clamping force produced by the sealing struts that lie opposite one another runs at least approximately perpendicularly to the mounting direction of the housing parts.

12 Claims, 6 Drawing Sheets

U.S. PATENT DOCUMENTS 7,691,165 B1 * 4/2010 Hammes .................. 55/495
8,062,404 B2 * 11/2011 Volkmer et al. ............. 55/497
2006/0080949 A1 * 4/2006 Moriyama et al. ........... 55/490
2011/0308214 A1 * 12/2011 Jessberger et al. ........... 55/502

* cited by examiner

Fig.14

FILTER UNIT FOR FILTERING GASEOUS FLUIDS

CROSS REFERENCE TO RELATED APPLICATIONS

This application is US National Stage Entry of international patent application no. PCT/EP2009/057138, filed Jun. 10, 2009 designating the United States of America, the entire disclosure of which is incorporated herein by reference. Priority is claimed based on Federal Republic of Germany patent application no. 10 2008 027 847.5, filed Jun. 11, 2008 and the Federal Republic of Germany patent application no. 10 2009 009 066.5, filed Feb. 16, 2009.

TECHNICAL FIELD

The invention concerns a filter unit for filtering gaseous fluids, especially air filters of motor vehicles, according to the preamble of claim 1.

PRIOR ART

DE 196 38 790 A1 discloses an intake air filter for an internal combustion engine that comprises a filter insert part with a filter element that is insertable into a filter housing. The filter housing is comprised of a housing base member and a cover that can be opened and is supported pivotably on the housing base member. The filter element of the filter insert part is framed by a frame on which a circumferentially extending sealing element is arranged for fluid-tight separation of the raw side from the clean side. In the inserted state, the sealing element is pressed axially against a stay fixedly connected to the housing wherein at the same time the frame of the filter element supports the sealing element in radial direction outwardly, i.e., transversely to the axial direction. Since the sealing action is however achieved by axial compression of the sealing element, the resulting stress must be compensated in the axial direction by the housing, for which purpose an appropriate design of the closure elements for securing the housing parts relative to each other is required.

U.S. Pat. No. 4,725,296 discloses a filter insert part for an air filter comprised of paper that is folded in zigzag shape and on the outer area is provided with a sealing frame. The sealing frame has a circumferentially extending sealing structure of deformable material and is clamped between two housing halves. The air filter insert part is sealed in axial direction wherein the sealing force is generated by a closure system for the two housing parts.

Moreover, EP 0 863 785 B1 discloses a filter element that is also comprised of a folded filter medium in the form of a flat plate. For stabilization of the filter element, stays are provided that extend transversely across the plate and each have a blade segment.

The invention has the object to provide with simple constructive measures a filter unit for filtration of gaseous fluids with which a reliable sealing action is effected while high clamping forces are avoided.

SUMMARY OF THE INVENTION

This object is solved according to the invention with the features of the independent claims. The dependent claims provide expedient further embodiments.

The filter unit according to the invention for the filtration of gaseous fluids, that is especially directed to air filters for motor vehicles, comprises a filter insert part with a filter medium and a sealing element that is insertable into a filter housing wherein the filter housing comprises at least two combinable housing parts between which the sealing element is clamped. The housing parts are provided for this purpose with sealing stays on which the sealing element is supported.

In one embodiment according to the invention, the sealing stays are arranged opposite one another wherein the clamping force that is supported by the oppositely positioned sealing stays and that acts on the sealing element extends at least approximately orthogonally to the mounting direction of the housing parts. This embodiment has the advantage that the seal is at least substantially clamped in radial direction, wherein the resulting stress is also extending in radial direction and, as a result of the at least approximately orthogonal orientation relative to the mounting direction, has no releasing effect that separates the housing parts from one another so that also closure devices that are provided between the housing parts are relieved from the sealing forces. Accordingly, such closure devices can be designed smaller or constructively simpler or optionally can also be eliminated entirely without the connection between the housing parts being significantly impaired thereby. The resulting stress that is opposite to the clamping force acting on the sealing element is compensated by the housing wall of the housing parts. The radial compression of the sealing element ensures a satisfactory sealing action between the raw side and the clean side of the filter insert part.

Expediently, the filter medium of the filter insert part is a filter paper that is folded in a zigzag shape and arranged as a plate that advantageously is framed by a circumferentially extending frame that is the support of the sealing element. The sealing element extends circumferentially about the filter medium and can be, for example, injection-molded onto the frame or optionally also immediately onto the filter medium.

The mounting direction that is usually extending along the longitudinal axis of the filter housing coincides advantageously with the flow-through direction through the filter medium of the fluid to be cleaned.

The sealing stays are arranged opposite one another in transverse direction and delimit accordingly on opposite sides the intermediately positioned sealing element that is loaded by the two sealing stays with a clamping force. The clamping force is oriented transversely to the mounting direction or axial direction and is transmitted through the sealing stays farther onto the respective housing part. The line of action of the clamping force is positioned at least approximately orthogonally to the mounting direction or axial direction. In principle, the line of action of the clamping force can also be positioned at an angle, for example, an angle of up to 30 degrees, relative to an orthogonal line to the mounting direction or longitudinal direction of the filter housing. For such an angular arrangement, at least one contact surface of one of the sealing stays that load the sealing element may be provided with an appropriately angled slant so that the axial joining during the mounting process is facilitated. As a result of angled orientation a relatively small resulting stress in the axial direction may be generated that however can be compensated easily by the existing closure devices.

The contact surfaces are preferably of a flat configuration wherein however in principle also non-flat contact surfaces, for example, curved contact surfaces may be considered within the context of the invention. In case of flat contact surfaces, they may have in the area of the contact to both sealing stays a parallel orientation relative to one another.

In the mounted state, the sealing element rests against the contact surfaces of the two sealing stays, wherein, as a result of the compression, the outwardly positioned sealing surface of the sealing element, respectively, is formed as a straight surface or complementary to the respective contact surface of the sealing stay. In this way, oppositely positioned sealing surfaces on the sealing element are provided of which one sealing surface is facing the filter medium and the second sealing surface is facing away from the filter medium. The line of action of the pressure force between the sealing surfaces extends as a result of force loading through the contact surfaces at the sealing stays in the afore described way orthogonally to the mounting axis or longitudinal axis at an angle to this orthogonal line.

The sealing elements may be directly injection-molded or foamed onto the filter medium or a frame framing the filter medium and may be embodied, for example, as a PUR foam seal. The sealing element extends at least partially in radial direction past the inflow surface or outflow surface of the filter medium wherein the radially projecting part of the foam seal expediently is positioned in a receiving space that is delimited directly or indirectly by the sealing stays. In principle, it is also possible to provide a force loading of the sealing element by the sealing stays within the contour of the inflow surface or outflow surface of the filter medium.

According to an expedient embodiment, the receiving space into which the sealing element projects in the mounted position is delimited on the side that is facing the filter medium by a sealing stay and on the side facing away from the filter medium by a support stay, wherein the sealing stay and the support stay are formed monolithically together with the same housing part. The second sealing stay projects in mounted position into the receiving space and is in particular supported on the inner wall of the support stay. The support stay and/or the immediately neighboring sealing stay may have in this connection a slanted guide surface that, relative to a parallel to the mounting direction or longitudinal direction, has an angle of, for example, not more than 30 degrees, in order to facilitate axial insertion of the sealing stay against the resistance of the sealing element located within the receiving space.

According to a further expedient embodiment it is provided that the receiving space for receiving the sealing element is delimited directly by the two sealing stays. In this embodiment, principally a support stay that is monolithically formed together with the sealing stay that is immediately neighboring the filter medium is no longer needed.

Furthermore, it is also possible to have the receiving space delimited by one of the sealing stays as well as the support stay wherein the sealing stay and the support stay are embodied monolithically. The radial pressure force on the sealing element is generated by means of the second sealing stay that will come to rest against the exterior side of the support stay and will force it in radial direction outwardly against the sealing element.

According to a further expedient embodiment it is provided that the sealing element engages the sealing stay that is immediately facing the filter medium. This is effected in particular by means of a flexible sealing lip that is part of the sealing element and in the mounted state is positioned across the sealing stay that is facing the filter medium. Before mounting, this sealing lip can project laterally or radially. Upon axial approach of the second housing part the projecting sealing lip is pressed into the receiving space wherein during this mounting movement the sealing lip will engage across the first sealing stay that is facing the filter medium.

In order to ensure that the sealing element in the mounted or joined state of the housing parts is subjected at least substantially to a radial pressing force and to no or only to a minimal axial pressing force, it may be expedient to provide on one housing part a stop for limiting the mounting direction which stop in the final mounted position is in contact with the other housing part. The stop delimits joining of the housing parts in axial direction so that it may be ensured that the sealing element is not loaded or only minimally loaded with a pressing force in axial direction.

In a further expedient embodiment an additional sealing member is provided between a housing part and the sealing element wherein the additional sealing member, relative to the contact surface between the sealing stay facing away from the filter medium and the sealing element, is displaced toward the clean side of the filter medium. The additional sealing member provides an additional contact location between the housing part and the sealing element wherein, as a result of positioning of the sealing member displaced toward the clean side of the filter medium, accidental soiling of the clean side during exchange of the filter insert part is safely prevented.

This embodiment with additional sealing member can be combined with the radial pressure action of the sealing element in an advantageous way.

According to a further embodiment according to the invention a sealing stay of one housing part and a sealing stay or support stay of another housing part engage each other in the manner of a tongue-and-groove connection in a positive-locking away. The sealing stay, for example, is embodied as a U-shaped housing structure and, in the mounted state, receives the sealing stay or support stay of the other housing part. In this way, a positive lock in transverse direction or radial direction is achieved which provides also a self-centering action in this direction. This has the advantage that for the production of the housing parts greater tolerances are acceptable so that, for example, curving of a sidewall of one of the housing parts may be permissible without any limitation of proper functionality. Such curved portions result, for example, from distortion, shrinkage or the like during manufacture. By means of the positive-looking interaction according to the tongue-and-groove principle such tolerances can be compensated. By means of a wedge-shaped extension of the sealing stay that is part of the U-shaped housing structure, axial mounting can be performed in a simple way and, in this connection, in radial direction a high pressing force onto the sealing element can be generated. Basically, also a straight embodiment of the sealing stay with contact surfaces embodied parallel with the mounting direction is also possible.

A tongue-and-groove connection is already produced in that the sealing stay engages the receiving space that is delimited by the second sealing stay and the support stay. This embodiment also provides a self-centering action during mounting; in addition, the complex U-shaped housing structure on the housing part that is opposite the receiving space is not required.

According to a further embodiment according to the invention it is provided that at least one sealing stay is engaged by a snap hook that is formed monolithically with one housing part and is moveable into a snap connection together with the other housing part. The snap hook engages expediently both sealing stays and is thus located in radial direction on the exterior side of the filter housing. This embodiment is expediently also combined with the radial compressibility of the sealing element.

The snap connection may comprise, in addition to the snap hook that is to be moved into a snap connection with the other housing part, a second centering element or centering pin that is provided in addition to the snap hook. The centering pin effects a centering action between the housing parts in particular in circumferential direction and/or in radial direction.

Moreover, by means of the pin an additional snap connection can be realized so that the safety against accidental detachment is increased.

The embodiment with the snap connection is expediently also combined with radial compressibility of the sealing element.

BRIEF DESCRIPTION OF THE DRAWINGS

Further advantages and expedient embodiments are disclosed in the further claims, the figure description and the drawings. It is shown in:

In the Figures, same components are identified with the same reference numerals.

EMBODIMENT(S) OF THE INVENTION

Figure 1:
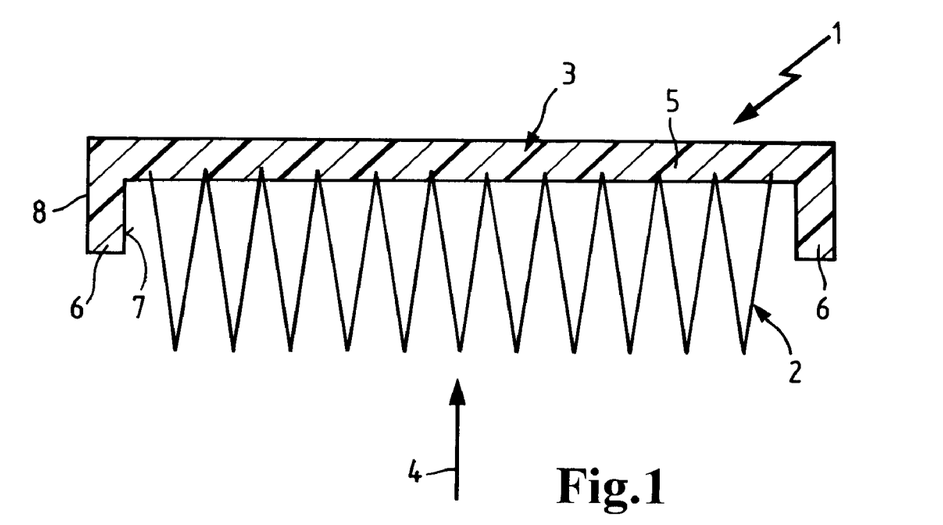
FIG. 1 a filter insert part for an air filter in a section illustration.

The air filter insert part 1, illustrated in FIG. 1, is a component of an air filter in the intake manifold of an internal combustion engine of a motor vehicle and is comprised of a filter medium 2 of filter paper that is folded in a zigzag shape and is embodied in a plate shape. The folded filter medium 2 assumes the shape of a rectangular plate and is provided with a circumferentially extending sealing element 3 that in the mounted state of the filter insert part 1 fluid-tightly separates the raw side from the clean side. The filter insert part 1 is flowed through in the direction of arrow 4 by the intake air to be filtered. The sealing element 3 that is arranged in the area of the clean side of the filter medium 2 is comprised preferably of polyurethane foam and, after folding and setting up the filter medium 2, is foamed or injection-molded thereto.

The sealing element 3 is comprised of a circumferentially extending stay 5 provided on the outer circumference on the clean side of the filter medium 2 and a sealing tongue 6 that laterally relative to the stay 5 projects downwardly and extends parallel to the flow-through direction 4. The circumferentially extending sealing tongue 6 has an inner sealing surface 7 that is facing the filter medium 2 and an outer sealing surface 8 that is facing away from the filter medium 2, wherein the sealing surfaces 7 and 8 of the sealing element 3 in the mounted state rest seal-tightly against sealing stays of the filter housing. The sealing tongue 6 receives in this connection the sealing or clamping force that is oriented orthogonally to the flow-through direction 4. The flow-through direction 4 extends parallel to the longitudinal axis of the housing.

Figure 2:
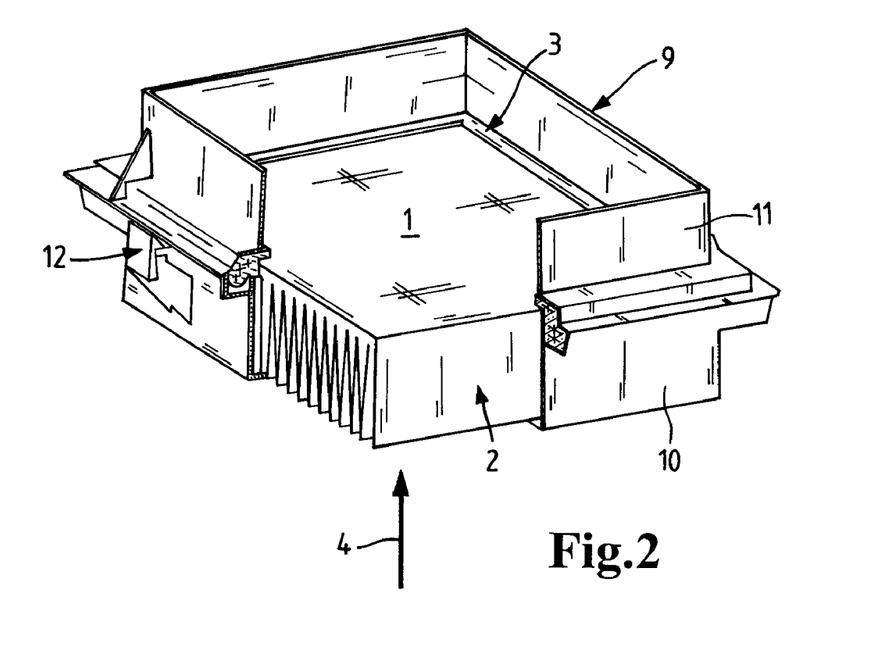
FIG. 2 an air filter with a housing top part and a housing bottom part and a filter insert part received in the housing.

In FIG. 2 an air filter is illustrated that is comprised of a two-part filter housing 9 and the filter insert part 1 inserted into the filter housing. The filter housing 9 has two housing parts 10 and 11 that are detachably connected to each other. The lower housing part 10 and the upper housing part 11, for example, a housing cover, are coupled with each other by a releasable connecting device that is embodied as snap connector 12. The direction in which the two housing parts 10 and 11 are mounted relative to one another extends coaxially to the flow-through direction 4 of the fluid through the filter insert part 1 or the longitudinal housing axis. For demounting the housing parts 10 and 11 they are accordingly moved away from one another along the longitudinal housing axis. The mounting direction coincides, as does the flow-through direction, with the longitudinal axis of the housing.

Figure 3:
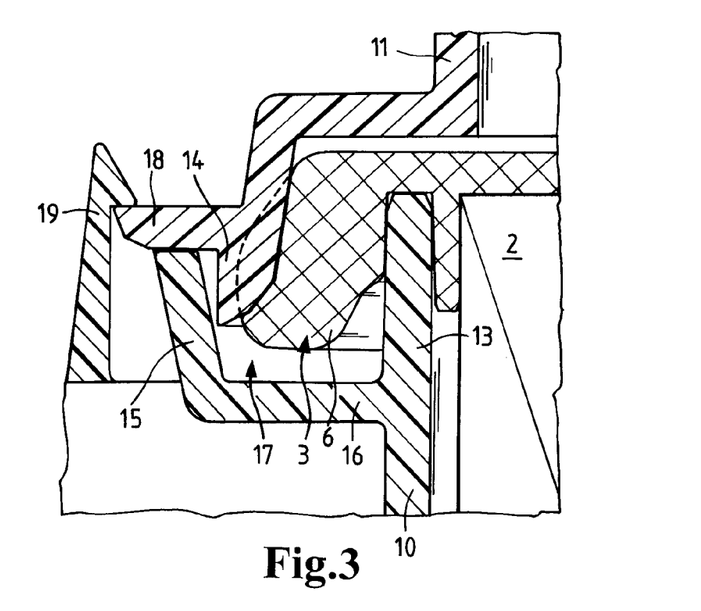
FIG. 3 a section of the rim area of the filter element, with a sealing element that is injection-molded onto the filter medium and projects into a receiving space and is delimited radially by sealing stays on the housing parts.

In FIG. 3 the filter unit is illustrated in the assembled state. The sealing tongue 6 of the sealing element 3 projects laterally, or relative to the longitudinal axis of the filter housing, radially past the filter medium 2 and is located in a receiving space 17 that has an approximately U-shaped cross-section and, on the side that is facing the filter medium 2, is delimited by a sealing stay 13 that is monolithically formed together with the lower housing part 10 as well as, on the side facing away from the filter medium 2, with a support stay 15 that is also formed monolithically together with the lower housing part 10. The support stay 15 is connected by a horizontally extending connecting section 16 with the sealing stay 13. The sealing stay 13 has an orientation that is parallel to the longitudinal axis of the housing. The side wall of the sealing stay 13 that is facing the sealing tongue 6 forms a contact surface extending parallel to the longitudinal axis of the housing. The support stay 15 is slanted relative to a longitudinal axis of the housing at an angle of 10 degrees to 20 degrees outwardly and forms a glide surface for axial insertion of a support stay 14 that is formed monolithically with the upper housing part 11 wherein the sidewall of the sealing stay 14 that is facing the sealing tongue 6 forms a contact surface. In the mounted state the sealing tongue 6 is radially clamped between the contact surfaces on the support stays 13 and 14 in the receiving space 17. The glide surface on the inner side of the support stay 15 facing the receiving space 17 can be utilized advantageously for facilitating axial insertion of the sealing stay 14 of the upper housing part 11. As a result of the angled orientation of the support stay 15 the receiving space 17 has on the upper side that is neighboring the end face of the support stay 15 a greater extension in radial direction than in the area of the bottom that is formed by the connecting section 16. In this way, easier insertion of the sealing stay 14 into the receiving space 17 is enabled. Upon axial insertion of the sealing stay 14 the original contour of the sealing tongue 6 that is illustrated in dashed lines is radially compressed until the contour of the sealing tongue 6 that is illustrated with solid lines is reached. The sealing force or pressing force is oriented in radial direction and is positioned thus at least approximately orthogonally to the longitudinal axis of the housing that also coincides with the mounting direction of the two housing parts 10 and 11.

The sealing stay 14 on the upper housing part 11 has an opposite angled orientation relative to the support stay 15 on the lower housing part 10 so that the contact surface on the inner side of the sealing stay 14 that is facing the sealing tongue 6 is approximately parallel to the contact surface on the oppositely positioned sealing stay 13 or, relative to a parallel, has only a small angular deviation of maximally 10 degrees wherein the slant is oriented opposite to the slant of the support stay 15.

For limiting the axial insertion of the sealing stay 14 into the receiving space 17, the sealing stay 14 has a radially projecting stop 18 that in the mounted position contacts the free end face of the support stay 15 of the lower housing part 10. The size of stop 18 as well as of the sealing element 3 of the sealing tongue 6 and of the receiving space 17 can be selected such that the topside of the sealing element 3 in the mounted state remains without significant force loading by the upper housing part 11. In this way, it is ensured that the sealing action is achieved by a radial compression of the sealing tongue 6 wherein the pressure force or sealing force in radial direction is received by the two sealing stays 13 and 14.

As can be seen also in FIG. 3, the two housing parts 10 and 11 are connected with each other by a locking or snap connection in axial direction in a positive-locking way. For this purpose, a snap hook 19 is formed monolithically together with the lower housing part 10 and in the mounted position engages the radially projecting stop on the upper housing part 11 like a snap connection. For detachment of the snap connection, the snap hook 19 can be bent in radial direction outwardly to such an extent that the snap hook 19 releases the stop 18. In radial direction or transverse direction, the snap hook 19 is located on the outer side of the filter housing wherein the snap hook 19, viewed in axial direction of the housing, at least substantially overlaps the sealing stays 13 and 14 as well as the support stay 15. The snap hook 19 is thus located in axial direction at the same level as the stays 13 to 15 so that the clamping force exerted by the snap connection between the housing parts 10 and 11 can develop its clamping force axially at the level of the stays. In this way, an optimal compression of the sealing tongue 6 in the receiving space 17 in radial direction is achieved.

Figure 4:
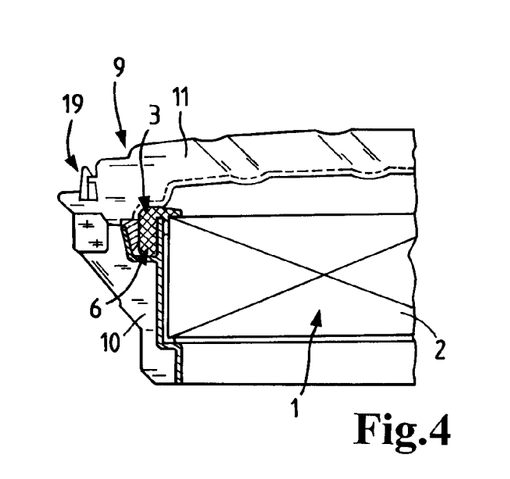
FIG. 4 an embodiment variant.
Figure 5:
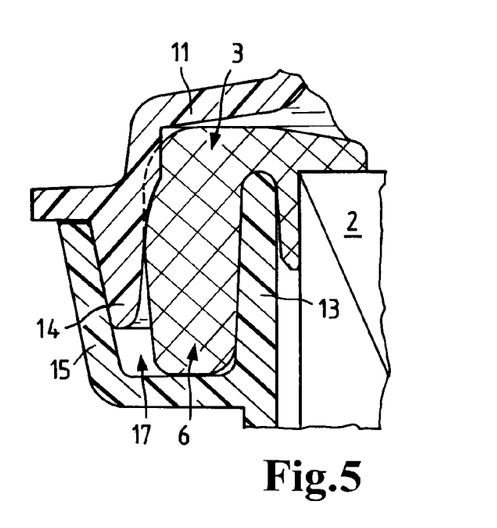
FIG. 5 a detail illustration of the embodiment variant according to FIG. 4.

In the embodiment according to FIGS. 4 and 5 the sealing tongue 6 of the sealing element 3 is also received in the receiving space 17 that with respect to the filter medium 2 is delimited by the sealing stay 13 of the lower housing part 10 and on the side that is facing away from the filter medium 2 by the support stay 15. In the mounted position, the exterior side of a further sealing stay 14, embodied monolithically together with the upper housing part 11, is resting immediately on the inner side of the support stay 15 that is formed monolithically together with the lower housing part.

The contact surface on the sealing stay 14 that is facing the sealing tongue 6 is embodied as a non-flat surface whose contour in axial direction is alternatingly minimally concavely and convexly formed. The basic geometry of the sealing stay 14 is a wedge shape and this facilitates axial insertion into the receiving space 17 while at the same time radial compression of the sealing tongue 6 is facilitated. The non-flat contour of the sealing stay 14 enables that the radial compression of the sealing tongue 6 in axial direction can be divided into zones of different sections. In this way, it can be controlled where the section with maximum radial pressing force is acting on the sealing tongue 6. This is realized, for example, axially approximately at the center of the sealing tongue 6. The contact surface on the sealing stay may have also two essentially flat surface sections that are however angled relative to one another.

Figure 6:
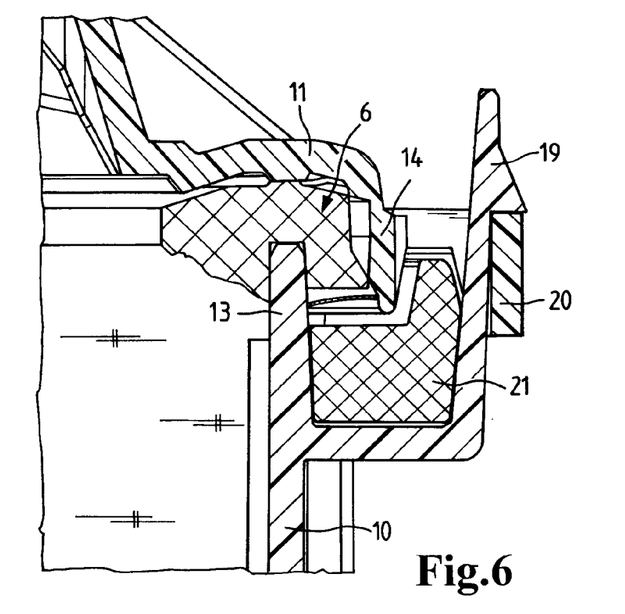
FIG. 6 a further embodiment with a snap connection between the housing parts.

In the embodiment according to FIG. 6, the sealing tongue 6 is delimited directly by the sealing stay 13 on the lower housing part and 14 on the upper housing part and is loaded by the sealing stays with a radial clamping force or pressing force. The upper or radially outwardly positioned sealing stay 14 is supported in radial direction outwardly on a further sealing element 21 that axially is arranged below the sealing tongue 6 and is supported in radial direction inwardly also by the sealing stay 13 and in radial direction outwardly by a snap hook 19. The snap hook 19 is passed through a cutout in the upper housing part and is supported on a wall section 20 of the upper housing part. The snap hook 19 is embodied monolithically together with the lower housing part and defines the receiving space into which the further sealing element 21 is inserted and into which also the sealing tongue 6 projects that extends across the free end face of the sealing stay 13.

Figure 7:
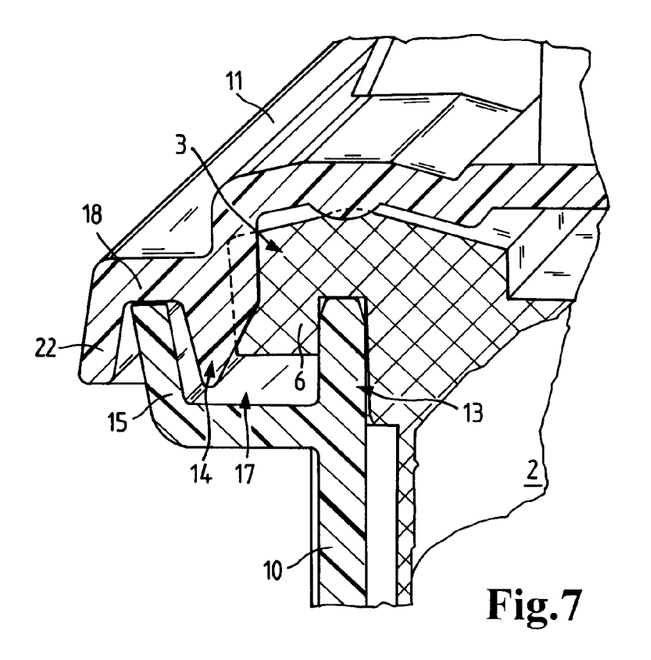
FIG. 7 a further embodiment with a U-shaped housing structure on one housing part into which a support stay on the other housing part projects.

The embodiment according to FIG. 7 correspond substantially to that of the FIGS. 3 and 5 but with the difference that the sealing stay 14 of the upper housing part 11 is a component of U-shaped housing structure in which the sealing stay 14 forms a leg, the horizontally extending section or stop 18 the bottom, and a further housing section 22 the second leg that, in analogy to the sealing stay 14, extends at least approximately in axial direction of the housing but optionally is positioned at a small angle relative to the axial direction. The U-shaped housing structure engages the support stay 15 on the lower housing part 10. In this way, a self-centering action of the upper housing part 11 relative to the lower housing part 10 during mounting of the housing parts is achieved when the housing parts 10, 11 are joined axially. The sealing stay 14 as well as the further housing section 22 are also minimally angled outwardly so that the interior of the U-shaped housing structure has the geometry of a trapezoid that opens outwardly so that the self-centering effect is enhanced and improved.

Figure 8:
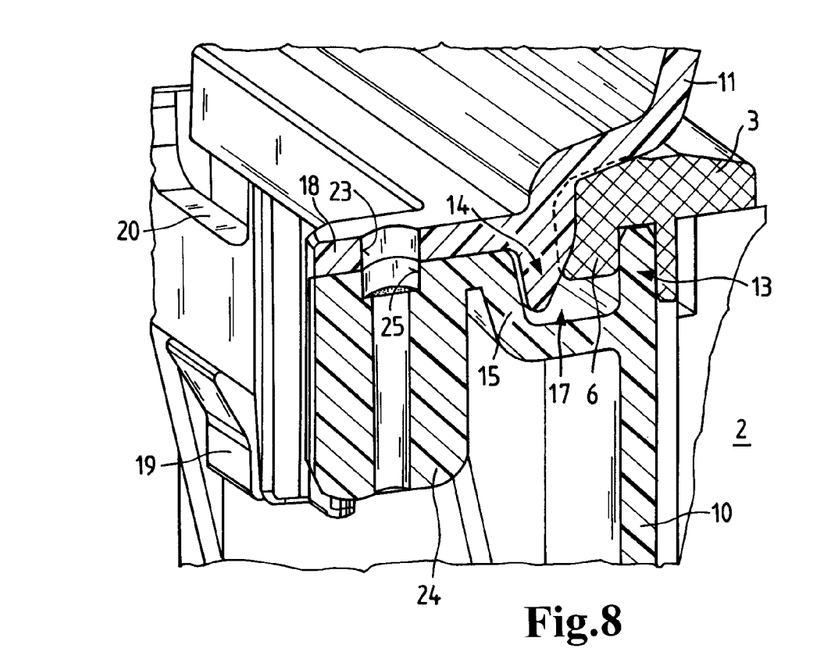
FIG. 8 a further embodiment in which for connection of the housing parts a support sleeve is arranged on the lower housing part and is aligned with a cutout in a stay on the upper housing part.
Figure 9:
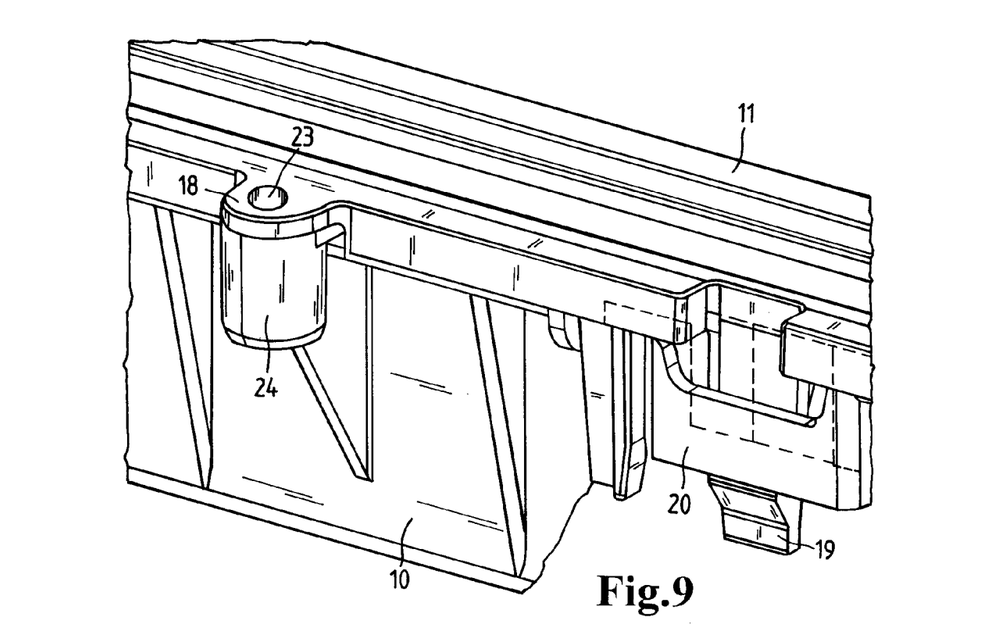
FIG. 9 a perspective illustration of the embodiment according to FIG. 8.

In the embodiment illustrated in FIGS. 8 and 9 the connecting device between the housing parts 10 and 11 is illustrated. The connecting device comprises on the one hand the locking connection or snap connection comprised of the snap hook 19 on one housing part that engages a wall section 20 at the other housing part in axial direction in a positive-locking way so that an axial detachment of the housing parts from one another is prevented. In the embodiment the snap hook 19 is monolithically formed together with the upper housing part 11 and the wall section 20 that delimits a cutout for passing through the snap hook is formed monolithically together with the lower housing part 10.

The connecting device comprises moreover a screw connection or a similar force-locking or positive-looking connection comprised of a tab-shaped section or projection 18 extending in radial direction and having a cutout 23 arranged therein and a support sleeve 24 formed on the other housing part with a through recess or through bore 25. The cutouts 23 in the section 18 and 25 in the support sleeve 24 are in aligned position with one another in the mounted state so that a screw or a similar connecting element can be passed through the recesses 23 and 25. The axis through the recesses 23 and 25 is parallel to the longitudinal housing axis. The projection 18 that extends radially outwardly and is monolithically formed together with the sealing stay 14 on the upper housing part 11 has, as is shown in particular in FIG. 9, a somewhat semi-circular geometry. Also, the support sleeve 24 that is formed radially outwardly of the support stay 15 on the lower housing part 10 has a corresponding semi-circular basic geometry.

The connecting device with the tab-shaped projection 18 and the aligned support sleeve 24 is in immediate neighborhood to the first connecting device with the snap hook 19 and the wall section 20.

Basically, the connection via the snap hook 19 and the wall section 20 suffices for an axial and radial joining between the housing parts 10 and 11. The further connecting device with the tab-shaped projection 18 and the support sleeve 24 may take on an emergency or repair function in case that the snap connection is inactive, for example, by material failure in the area of the snap hook 19.

In the embodiment according to FIGS. 8 and 9, a radial force loading of the sealing tongue 6 of the receiving element 3 is also realized by means of the sealing stays 13 and 14.

Figure 10:
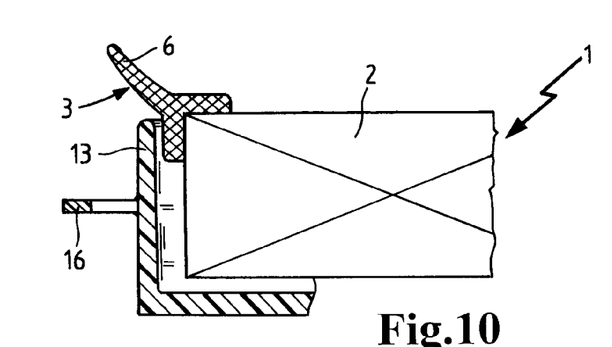
FIG. 10 a further embodiment where the sealing element has a laterally projecting sealing lip.
Figure 11:
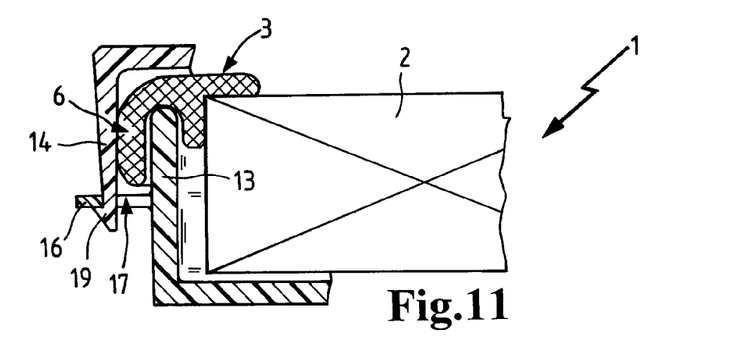
FIG. 11 an embodiment according to FIG. 10 in a mounted state in which the sealing lip is bent and engages a sealing stay.

In the embodiment according to FIGS. 10 and 11, the sealing element 3 is provided with a sealing tongue or lip 6 that in the unloaded state (FIG. 10) projects laterally and is bent by axial loading of the sealing stay 14 to such an extent that the sealing lip 6 will wrap about the free end face of the first sealing stay 13 and project into the receiving space 17 (FIG. 11).

As is shown in FIG. 11, the second sealing stay 14 simultaneously forms a snap hook 19 that is guided through a recess in the section 16 formed monolithically together with the first sealing stay 13. The outward part of the section 16 in radial direction is engaged positively by the snap hook 19. Therefore, the sealing stay 14, in addition to the radial force loading of the sealing tongue 6 of the sealing element 3, also has the function of a snap hook.

In the embodiment according to FIGS. 10 and 11, the radially projecting section 16 that is formed monolithically with the sealing stay 13 is required for the snap connection between the housing parts. With respect to the receiving space 17 into which in the mounted state the sealing lip 6 projects the radial connecting section 16 is not mandatory required. The receiving space 17 can basically be open axially in both directions because a radial limitation by the sealing stays 13 and 14 is sufficient in order to achieve a compression of the sealing elements.

Figure 12:
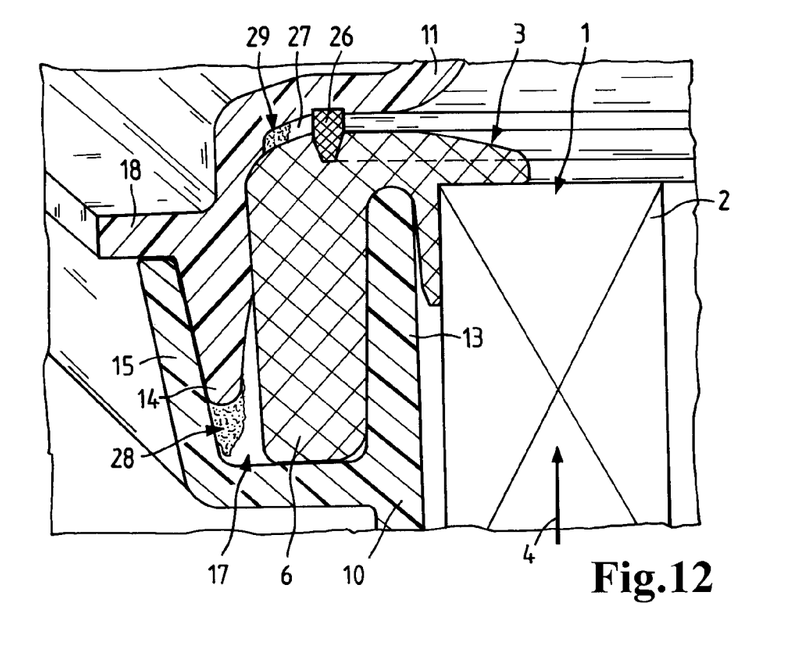
FIG. 12 a section of a further embodiment with an additional sealing member between the upper housing part and the sealing element.

In the embodiment according to FIG. 12, the sealing tongue 6 of the sealing element 3 that projects into the receiving space 17 is loaded with a radial clamping and pressing force that is effective between the sealing stays 13 and 14. The stop 18 that is formed monolithically together with the sealing stay 14 is positioned on the free end face of the support stay 15 that delimits the receiving space 17 in radial direction outwardly. The free end face of the sealing stay 14 projecting into the receiving space 17 is positioned at a spacing relative to the bottom of the receiving space so that in the intermediately positioned area dirt particles 28 may collect.

Moreover, an additional sealing member 26 between the sealing element 3 and a section of the housing part 11 is provided. In the embodiment, the sealing member 26 is embodied as a separate component. In principle, also a monolithic embodiment together with the sealing element 3 is conceivable. Relative to the sealing surface or contact surface between the sealing stay 14 and the sealing tongue 6 the sealing member 26 is displaced in the direction of the clean side of the filter medium 2. Between the sealing surface or contact surface between the sealing stay 14 and the sealing tongue 6 and the sealing member 26 located in the upper area of the sealing element 3 an additional dirt receptacle 27 is formed in which dirt particles 29 may collect. The dirt receptacle 27 provides an additional safety feature relative to accidental passage of dirt particles to the clean side of the filter device.

Figure 13:
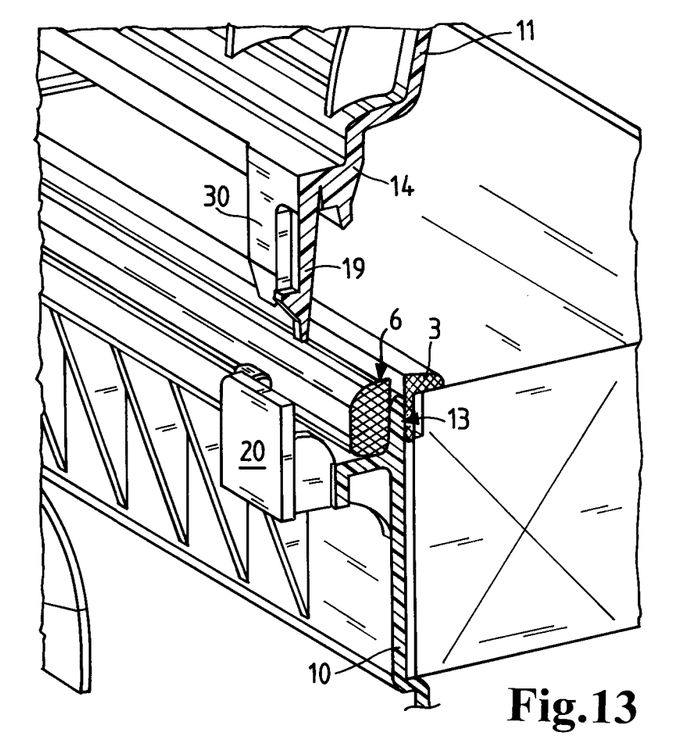
FIG. 13 a perspective illustration of a further embodiment with a snap connection on the housing parts.

In the embodiment according to FIG. 13, the sealing tongue 6 of the sealing element 3 is also subjected to a radial force that is exerted by the sealing stays 13 and 14 on the lower or upper housing part 10 or 11. The embodiment shows moreover a modified connecting device that comprises on the one hand the snap hook 19 that is monolithically formed together with the upper housing part 11 and can be moved into a snap connection with the wall section 20 on the lower housing part 10. On the other hand, the connecting device comprises a pin 30 that is also formed monolithically together with the upper housing part and extends in immediate neighborhood to the snap hook 19 in axial direction. The pin 30 projects into a receptacle that is delimited by the wall section 20 of the lower housing part 10. By means of the pin 30 a positive locking action in radial direction as well as in circumferential direction is achieved while by means of the snap hook 19 a positive locking action in axial direction is achieved.

Figure 14:
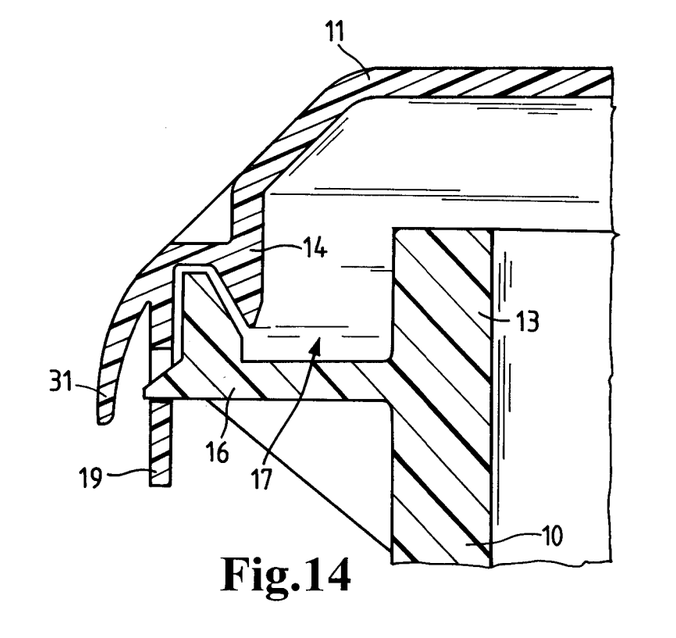
FIG. 14 an embodiment in section with a snap connection.

The embodiment according to FIG. 14 is also suitable for radial compression of a sealing element inserted into the receiving space 17 between sealing stays 13 and 14 on the lower or upper housing part. The snap hook 19 is monolithically formed together with the upper housing part 11 and has a receptacle into which a projection projects that is arranged radially or laterally outwardly on the horizontally extending connecting section 16 that is formed monolithically together with the lower housing part 10 wherein the connecting section 16 also forms the bottom of the receiving space 17. A tab 31 that overlaps axially the snap hook 19 as well as the projection on the horizontal connecting section 16 is monolithically formed together with the upper housing part 11 and extends approximately parallel to the snap hook 19 and is arranged on the outer side of the housing part in the radial direction.

The invention claimed is:

1. An air filter unit for filtration of gaseous fluids, comprising:
 a filter housing (9) having a longitudinal axis, said filter housing including a first housing part (10) including
  an axially extending first sealing stay (13), said sealing stay including a contact surface;
 a second housing part (11) including
  an axially extending second sealing stay (14) arranged radially outwardly of said first housing part (10) sealing stay (13), said second housing part (11) detachably joined to said first housing part in a mounting direction, said second sealing stay including a contact surface;
 a filter insert part (1) including a raw flow face and a clean flow face, said filter insert part (1) inserted into said housing (9), said filter insert part (1) including
  a filter medium (2); and
  a sealing element (3) arranged on a radial outer circumference of said filter medium at one of said flow faces, said sealing element extending radially outwardly from said outer circumference,
  said sealing element (3) secured to said filter medium;
 wherein said first housing part includes
  a connecting section (16) having a first end secured to an outwardly facing side of said sealing stay (13), said connecting section (16) extending radially outwardly from said sealing stay (13);
  a support stay (15) secured to an opposing second end of said connecting section (16), said sealing stay (13) with said connecting section (16) and said support stay (15) forming a U-shaped receiving space (17) surrounding an outer side of said first housing part (10);

wherein said second sealing stay (14) of said second housing part (11) is receiving into said U-shaped receiving space (17);

wherein said first sealing stay (13) separates an interior of said first housing part (10) from said U-shaped receiving space (17);

wherein a portion of said sealing element (3) clamped between said contact surface of sealing stays (13, 14) of said housing parts (10,11) in said U-shaped receiving space (17);

wherein said contact surfaces of radially spaced first and second sealing stays (13, 14) exert a clamping force radially compressing said sealing element (3), said clamping force extending approximately orthogonally to said mounting direction of said housing parts (10, 11).

2. The air filter unit according to claim 1, wherein
said contact surfaces on the sealing stays (13, 14) that load said sealing element (3) are positioned at an angle of maximally 30 degrees relative to each other.

3. The air filter unit according to claim 1, wherein
said contact surfaces on said sealing stays (13, 14) are at least approximately parallel to each other.

4. The air filter unit according to claim 1, wherein
said second sealing stay (14) projects into said receiving space (17) and rests immediately on said sealing element (3) when said housing parts (10, 11) are in a detachably mounted state.

5. The air filter unit according to claim 4, wherein
said second sealing stay (14) is positioned parallel to said support stay (15), and wherein said support stay (15) forms a glide surface for said second sealing stay (14) during mounting.

6. The air filter unit according to claim 1, wherein said first sealing stay (13) facing said filter medium (2) and said support stay (15) are formed monolithically with each other.

7. The air filter unit according to claim 1, wherein said receiving space (17) receiving said sealing element (3) is immediately delimited by said first and second sealing stays (13, 14).

8. The air filter unit according to claim 1, wherein said sealing element (3) engages said first sealing stay (13) facing said filter medium (2).

9. The air filter unit according to claim 8, wherein said sealing element (3) has a bendable sealing lip that in the mounted state is wrapped about said first sealing stay (13) facing said filter medium.

10. The air filter unit according to claim 1, further comprising:

an additional sealing member (26) arranged between one of said housing parts (10, 11) and said sealing element (3), wherein said additional sealing member (26), relative to said contact surface between the second sealing stay (14) facing away from the filter medium (2) and said sealing element (3), is displaced toward a clean side of said filter medium (2).

11. The air filter unit according to claim 1, wherein said second sealing stay (14) on said second housing part (11) and a sealing stay or support stay (15) on said first housing part (10) positive-lockingly engage each other in the manner of a tongue-and-groove connection.

12. The air filter unit according to claim 1, wherein at least one of said sealing stays (13, 14) is overlapped by a snap hook (19) that is formed monolithically together with one of said housing parts (10, 11) and is movable into a snap connection with said other housing part (10, 11).

\* \* \* \* \*

UNITED STATES PATENT AND TRADEMARK OFFICE
Certificate

Patent No. 8,409,312 B2                                                                                             Patented: April 2, 2013

On petition requesting issuance of a certificate for correction of inventorship pursuant to 35 U.S.C. 256, it has been found that the above identified patent, through error and without any deceptive intent, improperly sets forth the inventorship.
    Accordingly, it is hereby certified that the correct inventorship of this patent is: Günter Görg, Möglingen (DE); Markus Hanselmann, Lauffen a. N. (DE); Thomas Jessberger, Asperg (DE); Michael Metzger, Waiblingen (DE); Frank Pfeiffer, Mönsheim (DE); Björn Schmid, Stuttgart (DE); Arthur Sudermann, Ditzingen (DE) and Joerg Maier, Boenningheim (DE).

Signed and Sealed this Twenty-second Day of July 2014.

DUANE SMITH
*Supervisory Patent Examiner*
Art Unit 1776
Technology Center 1700